United States Patent [19]

Sado et al.

[11] Patent Number: 4,971,748

[45] Date of Patent: Nov. 20, 1990

[54] METHOD FOR PRODUCING A THREE-DIMENSIONALLY SHAPED AROMATIC IMIDE POLYMER SHEET ARTICLE

[75] Inventors: Takahiko Sado; Hiroaki Mori, both of Tokyo, Japan

[73] Assignee: UBE Industries, Ltd., Yamaguchi, Japan

[21] Appl. No.: 474,661

[22] Filed: Feb. 6, 1990

Related U.S. Application Data

[63] Continuation of Ser. No. 282,861, Dec. 9, 1988, abandoned, which is a continuation of Ser. No. 10,847, Feb. 5, 1987, abandoned.

[30] Foreign Application Priority Data

Feb. 6, 1986 [JP] Japan .................. 61-24628

[51] Int. Cl.$^5$ ............... B29C 43/02; B29C 51/08; B29C 51/10; B29C 55/02
[52] U.S. Cl. .................. 264/553; 264/544; 264/554; 264/291; 264/292; 264/293; 264/320; 528/353
[58] Field of Search ............ 264/284, 291, 293, 320, 264/322, 544, 547, 548, 549, 550, 551, 553, 554, 571; 528/353

[56] References Cited

U.S. PATENT DOCUMENTS

| | | | |
|---|---|---|---|
| 2,666,951 | 1/1954 | Grove et al. | 264/544 |
| 3,007,206 | 11/1961 | Griswold | 264/544 |
| 3,471,460 | 10/1969 | Rees | 264/544 X |
| 3,737,494 | 6/1973 | Wolf | 264/550 X |
| 3,737,496 | 6/1973 | Voorhees | 264/594 |
| 4,211,743 | 7/1980 | Nauta et al. | 264/284 |
| 4,370,290 | 11/1983 | Makino et al. | 264/184 |
| 4,378,324 | 3/1983 | Makino et al. | 264/41 |
| 4,388,356 | 6/1983 | Hrivnak et al. | 428/35 |
| 4,499,042 | 2/1985 | Ishizuka et al. | 264/205 |
| 4,582,665 | 4/1986 | Jabarin | 264/544 |

FOREIGN PATENT DOCUMENTS

| | | | |
|---|---|---|---|
| 922922 | 4/1963 | United Kingdom | 264/550 |
| 2070460 | 9/1981 | United Kingdom | 528/353 |

Primary Examiner—Mary Lynn Fertig Theisen
Attorney, Agent, or Firm—Finnegan, Henderson, Farabow, Garrett & Dunner

[57] ABSTRACT

A three-dimensionally shaped aromatic imide polymer sheet article is produced by a method comprising the steps of shaping an aromatic imide polymer sheet having a second order transition temperature of 250° C. to 400° C. and an ultimate elongation of 120% or more at 100° C., by press-stretching at least a portion of the sheet at a temperature of 100° C. or more, but not exceeding a temperature of 100° C. higher than the second order transition temperature of the sheet, into a desired three-dimensional convex or concave form protruding from the sheet, heat-setting the resultant shaped sheet article in its shaped form at a temperature equal to or higher than the second order transition temperature of the sheet, and then cooling the heat-set sheet article to a desired low temperature.

9 Claims, 1 Drawing Sheet

METHOD FOR PRODUCING A THREE-DIMENSIONALLY SHAPED AROMATIC IMIDE POLYMER SHEET ARTICLE

This application is a continuation, of application Ser. No. 07/282,861, filed Dec. 9, 1988 which was a continuation of application Ser. No. 07/010,847 filed Feb. 5, 1987 both now abandoned.

BACKGROUND OF THE INVENTION

1. Field of the Invention

The present invention relates to a method for producing a three-dimensionally shaped aromatic imide polymer sheet article. More particularly, the present invention relates to a method for producing a three-dimensionally shaped article having at least one convexity or concavity from an aromatic imide polymer sheet.

2. Description of the Related Arts

It is known that an aromatic imide polymer exhibits an excellent heat resistance and superior chemical and physical properties and, therefore, is useful as a resinous material to be employed under severe conditions, and there are a number of studies underway into the utilization of various aromatic imide polymers.

It is also known that most of the known aromatic imide polymers are employed in the form of a flat sheet or film, and it is very difficult to form a three-dimensional shape from the aromatic imide polymer sheet, because of a poor formability thereof. That is, a method for industrially producing three-dimensionally shaped articles, for example, various forms of cups or containers, from the aromatic imide polymer sheet, has not been known.

The above-mentioned problem has arisen because most of the conventional aromatic imide polymers substantially do not have a satisfactory thermoplastic property, when compared to ordinary thermoplastic polymers, and therefore, it is practically impossible not only to directly mold the conventional aromatic imide polymers by means of a usual extrusion forming or injection forming method into a desired form of an article, for example, a container, but also to shape sheets or films of the conventional aromatic imide polymers by means of a conventional sheet-shaping method.

Various industries wish to utilize the aromatic imide polymers, which exhibit an excellent heat resistance and chemical resistance, to provide heat and chemical resistant articles, for example, protective containers and protective covers for electric and electronic parts and electric and electronic devices which are subjected to heat treatments and/or chemical treatments. But, due to their poor formability, most of the conventional aromatic imide polymer sheets cannot be shaped into three-dimensionally shaped articles having a desired convexity or concavity and usable as containers or covers, with an industrially satisfactory efficiency.

Before the present invention, it has not been known how to industrially produce a three-dimensionally shaped aromatic imide polymer article, for example, a container or cover, from an aromatic imide polymer sheet having an excellent heat resistance and desirable chemical and physical properties.

SUMMARY OF THE INVENTION

An object of the present invention is to provide a method for producing three-dimensionally shaped aromatic imide polymer articles having at least one convexity or concavity from a specific aromatic imide polymer sheet, with a satisfactory efficiency.

Another object of the present invention is to provide a method for producing three-dimensionally shaped aromatic imide polymer articles usable as containers or covers, from a specific aromatic imide polymer sheet by a simple, easy shaping operation without using an adhesive.

The above-mentioned objects can be attained by the method of the present invention for producing a three-dimensionally shaped aromatic imide polymer sheet article, comprising the steps of: three-dimensionally shaping a sheet consisting essentially of an aromatic imide polymer and having a second order transition temperature of from 250° C. to 400° C. and an ultimate elongation of 120% or more determined by a tensile test at a temperature of 100° C., by press-stretching at least a portion of the sheet at a temperature of 100° C. or more, but not exceeding a temperature of 100° C. higher than the second order transition temperature of the sheet, to shape a portion of the sheet into a desired concave or convex form; maintaining the resultant shaped sheet article in said concave- or convex-shaped form at a temperature equal to or higher than the second order transition temperature of the sheet; and cooling the shaped sheet article to a desired low temperature.

DESCRIPTION OF THE PREFERRED EMBODIMENTS

Figure 1:
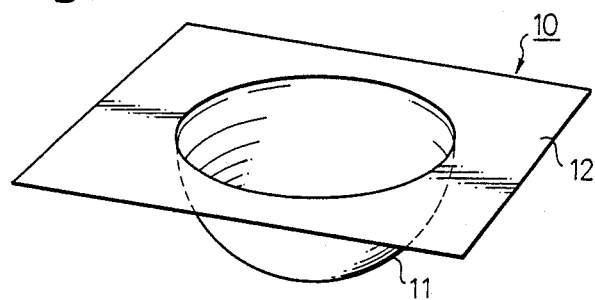
FIGS. 1 to 3 are schematic views of an embodiment of the shaped articles produced respectively in accordance with the method of the present invention.

In the method of the present invention, a sheet to be three-dimensionally shaped consists essentially of a specific aromatic imide polymer which exhibits a second order transition temperature of from 250° C. to 400° C., preferably from 260° C. to 380° C., and an ultimate elongation of 120% or more, preferably from 130% to 300%, determined by a tensile test (ASTM D 882) at a temperature of 100° C. This sheet is usually a flat sheet but may be a porous sheet, perforated sheet, corrugated sheet or metted sheet.

Preferably, the aromatic imide polymer sheet has a thickness of from 5 to 1000 μm, more preferably, from 10 to 500 μm.

The second order transition temperature of the aromatic imide polymer can be determined in accordance with an ordinary dynamic viscoelasticity-measuring method for ordinary thermoplastic polymers by means of, for example, a Mechanical Spectrometer, which is a trademark of a dynamic viscoelasticity-testing machine made by Reometric Co.

The sheet having the above-mentioned second order transition temperature and ultimate elongation consists essentially of a specific aromatic imide polymer which is a polymerization-imidization product of an aromatic tetracarboxylic acid component consisting of at least one aromatic tetracarboxylic acid or a dianhydride, ester or salt thereof with an aromatic diamine component consisting of at least one aromatic diamine.

The sheet is usually produced in such a manner that a dope solution of a polymerization product of the aromatic tetracarboxylic acid component with the aromatic diamine component, namely an aromatic polyamic acid having a high molecular weight, in a polar organic solvent consisting of at least one organic liquid compound selected from, for example, amide compounds and phenol compounds, is spread on a surface of a substrate to form a thin layer of the dope solution, the dope solution layer is solidified to a dry sheet, and the dry aromatic polyamic acid sheet is imidized at an elevated temperature of, for example, from 200° C. to 600° C., to provide a dry aromatic imide polymer sheet.

Alternatively, the sheet is produced in such a manner that a dope solution of an aromatic imide polymer in the above-mentioned phenolic solvent is spread on a substrate surface to form a thin layer thereof and then the dope solution layer is solidified.

The specific aromatic imide polymer sheet usable for the method of the present invention exhibits a satisfactory formability at an elevated temperature, and the resultant shaped article exhibits an excellent heat resistance and mechanical property.

In the preparation of the aromatic imide polymer usable for the method of the present invention, the aromatic tetracarboxylic acid component preferably consists of at least one member selected from the group consisting of biphenyltetracarboxylic acids such as 3,3′,4,4′-biphenyltetracarboxylic acid and 2,3,3′, 4′-biphenyltetracarboxylic acid, benzophenonetetracarboxylic acids such as 3,3′,4,4′-benzophenonetetracarboxylic acid, bis(3,4-dicarboxyphenyl)methane, 2,2-bis(3,4-dicarboxyphenyl)propane and dianhydrides, esters and salts of the above-mentioned acids.

More preferably, the aromatic tetracarboxylic acid component contains, as a principal ingredient, at least 80 molar%, further preferably at least 90 molar%, of at least one biphenyltetracarboxylic dianhydride selected from 3,3′,4,4′-biphenyltetracarboxylic dianhydride and 2,3,3′, 4′-biphenyltetracarboxylic dianhydride.

Also, the aromatic diamine component usable for the preparation of the aromatic imide polymer preferably contains, as a principal ingredient, at least one aromatic diamine having at least two benzene rings, more preferably 2 to 5 benzene rings, selected from the group consisting of, for example, 4,4′-diaminodiphenylether, 3,4′-diaminodiphenylether, 4,4′-diaminodiphenylmethane, 3,4′-diaminodiphenylmethane, 1,4-bis(4-aminophenoxy)benzene, ortho-tolidine, o-tolidine sulfone, bis(4-aminophenoxyphenyl)methane and bis(4-aminophenoxyphenyl)sulfone.

More preferably, the aromatic diamine component contains, as a principal ingredient, at least 80 molar%, further preferably at least 90 molar %, of at least one member selected from the group consisting of diaminodiphenylethers, diaminodiphenylmethanes and diaminodiphenylsulfones.

The aromatic tetracarboxylic component is mixed with the aromatic diamine component in a polar organic solvent, the resultant polymerization mixture is polymerized at an appropriate polymerization temperature, for example, of from 10° C. to 200° C., to provide a dope solution of a resultant aromatic polyamic acid or a resultant aromatic imide polymer having a concentration of from 5 to 30% by weight.

The resultant dope solution is spread on a surface of a sheet-forming substrate, for example, a metal belt, a metal drum or a metal plate having a smooth surface, to form a thin layer of the dope solution in accordance with a dope solution-spreading method. The dope solution layer is solidified by evaporating the solvent from the layer at a temperature of from about 50° C. to about 300° C., and if necessary, the aromatic polyamic acid is imidized to the corresponding aromatic imide polymer. Further, if necessary, the resultant aromatic imide polymer sheet is heat-treated at a temperature of from 300° C. to 600° C. The heat-treated aromatic imide polymer sheet has a satisfactory self-supporting property.

In the polymerization of the aromatic tetracarboxylic acid component containing, as a principal component, at least one biphenyltetracarboxylic dianhydride with the aromatic diamine component, when the polymerization solvent consists of at least one amide compound and the polymerization temperature is about 60° C. or less, the resultant polymerization product consists of an aromatic polyamic acid, and when the polymerization solvent consists of at least one phenol compound and the polymerization temperature is about 140° C. or more, the resultant polymerization product consists of an aromatic imide polymer.

The dope solution of the aromatic polyamic acid or the aromatic imide polymer is chemically stable and can be stored for a long period of time without a deterioration of quality.

The amide compounds usable as a polymerization solvent includes N-methyl-2-pyrrolidone, N,N-dimethylformamide, N,N-diethylformamide, N,N-dimethylacetamide, N,N-diethylacetamide and N,N-dimethylsulfamide. Also, the phenol compounds usable as the polymerization solvent for the aromatic imide polymer include phenol, cresol and halogenated phenols, for example, p-chlorophenol.

The aromatic imide polymer usable for the method of the present invention preferably exhibits a logarithmic viscosity number of from 0.5 to 7.0 determined at a concentration of 0.5 g/100 ml in p-chlorophenol at a temperature of 50° C.

In the method of the present invention, the specific aromatic imide polymer sheet is three-dimensionally shaped by press-stretching at least a portion of the sheet at a temperature of 100° C. or more but not exceeding a temperature of 100° C. higher than the second order transition temperature of the sheet, preferably, a temperature of 120° C. or more but not exceeding a temperature of 80° C. higher than the second order transition temperature of the sheet to form a concave or convex shape in the portion of the sheet, from one side of the sheet, and to shape the portion of the sheet to a desired concave or convex form protruding from the sheet.

The three-dimensional shaping operation may be carried out at a temperature of 100° C. or more and lower than the second order transition temperature of the sheet. But, preferably, the three-dimensional shaping temperature is 5° C. to 15° C. above the second order transition temperature of the sheet, to enable the shaping operation to be smoothly carried out and to obtain a shaped aromatic imide polymer article having a satisfactory heat resistance, an excellent heat dimensional stability, and a low heat shrinkability.

In the three-dimensional shaping step, a pressing force is applied to at least one portion of the sheet to push the portion of the sheet which is in a plastic condition at the above-mentioned elevated temperature in a direction crossing the plane of the sheet and thus, to cause the portion of the sheet to be stretched in the above-mentioned direction. That is, the portion of the sheet is shaped into a desired concave or convex form protruding from the plane of the sheet. The three-dimensional shaping operation can be carried out in accordance with any known shaping methods, for example, a draw forming method including a deep drawing method, a vacuum forming method, or air pressure forming method, an emboss forming method, and a drape forming method.

Preferably, in the three-dimensional shaping step, a specific aromatic imide polymer film is fixed on a substrate of a draw forming machine, and is heated at a predetermined elevated temperature, and then a male former is placed on a portion of the heated sheet and pushes the portion of the sheet at a right angle to the plane of the sheet to cause the portion of the sheet to be stretched and to be shaped into a concave or convex form protruding from the plane of the sheet.

In another shaping method, a specific aromatic imide polymer sheet is pressed by means of an emboss forming machine having a heat-embossing roll having a number of convexities formed on a peripheral surface of the roll and a heat emboss-receiving roll having a number of concavities corresponding to the convexities and formed on the peripheral surface of the roll. The aromatic imide polymer sheet is preheated at a predetermined shaping temperature or a temperature close thereto, if necessary. The sheet is then continuously embossed between the heat embossing roll and the heat emboss-receiving roll at the predetermined shaping temperature. The resultant embossed sheet has a number of convexities or concavities protruding from the plane of the sheet.

The resultant shaped aromatic imide polymer sheet article is maintained in the thus-shaped form thereof at an elevated temperature equal to or higher than the second order transition temperature of the sheet, preferably a temperature 5° C. to 100° C. higher than the second order transition temperature, more preferably 10° C. to 80° C. higher than the second order transition temperature, for a time necessary to heat set the shaped sheet article in the shaped form thereof, for example, one second or more, particularly from 5 seconds to 30 minutes. Thereafter, the shaped sheet article is cooled to a desired temperature, for example, in the range of from room temperature to 60° C. while maintaining the shaped sheet article in the shaped form, and the cooled sheet article is then removed from the shaping machine.

In accordance with the method of the present invention the specific aromatic imide polymer sheet having a thickness of, for example, from 5 μm to 10000 μm, is converted to a shaped sheet article having at least one convexity or concavity and usable as a cover or container article.

There is no specific limitation to the shape or form and dimensions of the concavity or convexity in the sheet.

For example, referring to FIG. 1, an aromatic imide polymer sheet article 10 is composed of a flat base sheet portion 12 and a hemisphere-shaped concave portion 11 protruding downward from the flat base sheet portion 12.

The concave portion 11 may be in the form of a vertical cylinder, a cup, or a bottom of a pan or pot.

Figure 2:
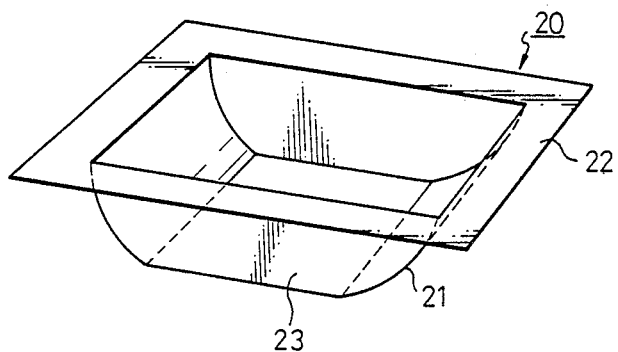

Referring to FIG. 2, another aromatic imide polymer sheet article 20 is composed of a flat base sheet portion 22 and a trapezoid-shaped concave portion 21 having a flat plane bottom 23 parallel to the flat base sheet portion 22.

The concave portion 21 may be in the form of a trigonal cylinder, a quadrangular cylinder, hexagonal cylinder, a trigonal dish or a hexagonal dish.

Figure 3:
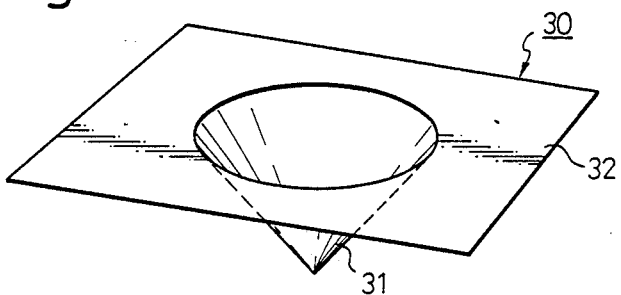

Referring to FIG. 3, still another aromatic imide polymer sheet article 30 is composed of a flat base sheet portion 32 and a reversed cone-shaped concave portion 31.

The concave portion 31 may be in the form of a reversed triangle pyramid, a reversed quadrangular pyramid or a reversed hexagonal pyramid.

The present invention will be further explained by way of specific examples, which, however, are representative and do not restrict the scope of the present invention in any way.

In the examples, the logarithmic viscosity number of a polymer was determined by measuring the viscosities of a solution of the polymer in a concentration of 0.5 g/100 ml in a solvent consisting of p-chlorophenol, and of the solvent at a temperature of 50° C., and by calculating in accordance with the following equation:

$$\text{Logarithmic viscosity number} = \frac{\log_e (Vs/Vp)}{C}$$

wherein Vs represents a viscosity of the solvent, Vp represents a viscosity of the solution of the polymer in the solvent, and C represents a concentration of the polymer in the solution.

Example 1.

A solution of an aromatic imide polymer consisting of a polymerization-imidization product of 3,3',4,4'-biphenyltetracarboxylic dianhydride (s-BPDA) with 4,4'-diaminodiphenylether (DADE) and having a logarithmic viscosity number of 3.4, in a concentration of 0.5 g/100 ml in p-chlorophenol was converted to a flat solid film having a thickness of 50 μm by means of a dope solution-spreading method.

The resultant aromatic polyimide sheet exhibited a second order transition temperature of 285° C. determined by the afore-mentioned dynamic viscoelasticity test, and an ultimate elongation of 130% determined by the tensile test at a temperature of 100° C., and another ultimate elongation of 250% at the second order transition temperature.

The aromatic polyimide sheet was subjected to a draw-forming machine wherein a portion of the sheet was pressed by a male former in the form of a sphere having a diameter of 200 mm at a right angle to the plane of the sheet and at a shaping temperature of 300° C., to cause the pressed portion of the sheet to be stretched and to form a hemispherical-shaped concavity protruding from the sheet plane. The resultant shaped sheet article was maintained in the shaped form at a temperature of 350° C. for 30 seconds, and then cooled to room temperature.

The press-stretching operation, the maintaining operation, and the cooling operation were successively carried out in one cycle in a time of about 30 minutes.

In the resultant shaped sheet article, the concave portion had a thickness of 42 μm, a depth of 50 mm, and a diameter of 200 mm.

Also, it was found that the concave portion of the resultant shaped sheet article had a satisfactory appearance and an even thickness, and exhibited a satisfactory heat resistance and chemical resistance similar to those of the base sheet portion of the shaped sheet article. During the press-stretching operation, the thickness of the shaped portion of the sheet was evenly reduced from 50 μm to 42 μm, without breakage of the shaped portion.

We claim:

1. A method for producing a three-dimensionally shaped aromatic imide polymer sheet article, comprising the steps of:

three-dimensionally shaping a sheet consisting essentially of an aromatic imide polymer which is a polymerization-imidization product of an aromatic tetracarboxylic acid component consisting of at least one member selected from the group consisting of biphenyltetracarboxylic acids, benzophenonetetracarboxylic acids, bis (3,4-dicarboxyphenyl) methane, 2,2-bis(3,4-dicarboxyphenyl) propane, and dianhydrides, esters and salts of the above-mentioned tetracarboxylic acids, with an aromatic diamine component consisting of at least one aromatic diamine having at least two benzene rings, said sheet having a second order transition temperature of from 250° C. to 400° C. and an ultimate elongation of 120% or more determined by a tensile test at a temperature of 100° C., by press-stretching at least a portion of the sheet at a temperature of 100° C. or more but not exceeding a temperature of 80° C. higher than the second order transition temperature of the sheet to shape the portion of the sheet into a desired concave or convex form;

maintaining the resultant shaped sheet article in said shaped form at a temperature equal to or higher than the second order transition temperature of the sheet; and cooling the shaped sheet article to a desired low temperature.

2. The method as claimed in claim 1, wherein the aromatic tetracarboxylic acid component contains at least 80 molar % of at least one member selected from the group consisting of 3,3',4,4'-biphenyltetracarboxylic acid, 2,3,3',4'-biphenyltetracarboxylic acid and dianhydrides, esters and salts of the above-mentioned tetracarboxylic acids.

3. The method as claimed in claim 1, wherein the aromatic diamine component contains at least 80 molar % of at least one member selected from the group consisting of 4,4'-diaminodiphenylether and 3,4'-diaminodiphenylether.

4. The method as claimed in claim 1, wherein the aromatic imide polymer has a logarithmic viscosity number of from 0.5 to 7.0 determined at a concentration of 0.5 g/100 ml in p-chlorophenol at a temperature of 50° C.

5. The method as claimed in claim 1, wherein the press-stretching operation is carried out by a draw forming method.

6. The method as claimed in claim 1, wherein the press-stretching operation is carried out by a vacuum forming method.

7. The method as claimed in claim 1, wherein the press-stretching operation is carried out by an air pressure forming method.

8. The method as claimed in claim 1, wherein the press-stretching operation is carried out by an emboss forming method.

9. The method as claimed in claim 1, wherein the aromatic imide polymer sheet has a thickness of from 5 to 1000 μm.

* * * * *